US011686398B1

United States Patent
Huang

(10) Patent No.: US 11,686,398 B1
(45) Date of Patent: Jun. 27, 2023

(54) CONTROL VALVE OF MANUAL/AUTOMATIC AND COLD/HOT WATER FAUCET

(71) Applicant: HYDROTEK CORPORATION, Nantou (TW)

(72) Inventor: Su Huang, Nantou (TW)

(73) Assignee: HYDROTEK CORPORATION, Nantou (TW)

( * ) Notice: Subject to any disclaimer, the term of this patent is extended or adjusted under 35 U.S.C. 154(b) by 0 days.

(21) Appl. No.: 17/571,402

(22) Filed: Jan. 7, 2022

(51) Int. Cl.
  *E03C 1/05* (2006.01)
  *F16K 11/078* (2006.01)
  *F16K 11/072* (2006.01)
  *F16K 11/00* (2006.01)

(52) U.S. Cl.
  CPC ............ *F16K 11/072* (2013.01); *E03C 1/055* (2013.01); *F16K 19/006* (2013.01); *F16K 11/0787* (2013.01)

(58) Field of Classification Search
  CPC .... F16K 11/072; F16K 19/006; F16K 11/074; F16K 11/0743; F16K 11/0782; F16K 11/0787; E03C 1/055
  See application file for complete search history.

(56) References Cited

U.S. PATENT DOCUMENTS

| 8,474,481 | B2 | 7/2013 | Huang | |
| 2007/0044850 | A1* | 3/2007 | Pieters | F16K 11/0787 137/597 |
| 2020/0340221 | A1* | 10/2020 | Peng | E03C 1/04 |

* cited by examiner

*Primary Examiner* — Michael R Reid
(74) *Attorney, Agent, or Firm* — Pai Patent & Trademark Law Firm; Chao-Chang David Pai

(57) ABSTRACT

A control valve of a manual/automatic and cold/hot water faucet includes a sliding member, a linking member, and an operating member. The sliding member has a notch. The linking member is recessed with a connecting groove. The operating member has a valve stem and a linking portion. The linking portion drives the linking portion and the sliding portion through the connecting groove. The valve stem, the connecting groove and the central axis are arranged concentrically, so that the overlapping area of the notch and the cold water hole is equal to the overlapping area of the notch and the hot water hole to keep the same ratio of cold water to hot water in an automatic mode to dispense water, thereby increasing the safety in use.

7 Claims, 10 Drawing Sheets

CONTROL VALVE OF MANUAL/AUTOMATIC AND COLD/HOT WATER FAUCET

FIELD OF THE INVENTION

The present invention relates to a cold/hot water faucet, and more particularly, to a control valve of a manual/automatic and cold/hot water faucet.

BACKGROUND OF THE INVENTION

With living quality upgraded by technical improvement, faucets are required not only to provide cold/hot water, but also to be installed with a sensor, such as an infrared device, so as to automatically dispense water as long as being induced. However, in the event of power outage or power exhaustion, the sensor cannot be induced for the faucet to dispense water.

In view of this, the inventor of this application made improvements to the above shortcomings and filed a patent application as disclosed in U.S. Pat. No. 8,474,481 titled "MANUAL/AUTOMATIC AND COLD/HOT FAUCET WITH CERAMIC VALVE". The faucet can automatically detect the presence of a user's hands to dispense water in a normal state. When the sensor fails, the user can open the ceramic valve for the faucet to dispense water. Compared with the above-mentioned conventional faucet, the manual/automatic and cold/hot faucet with the ceramic valve improves the inconvenience of the above-mentioned conventional faucet greatly. However, after the previous user uses the faucet to dispense hot water in the manual mode, the faucet will dispense hot water when the next user uses the faucet in the automatic mode. This may cause burns to the user and result in a lack of safety in use. Accordingly, the inventor of the present invention has devoted himself based on his many years of practical experiences to solve these problems.

SUMMARY OF THE INVENTION

The primary object of the present invention is to provide a control valve of a manual/automatic and cold/hot water faucet, which keeps the same ratio of cold water to hot water in an automatic mode to dispense water, thereby increasing the safety in use.

In order to achieve the above object, the present invention provides a control valve of a manual/automatic and cold/hot water faucet. The control valve is mounted in the manual/automatic and cold/hot water faucet. The manual/automatic and cold/hot water faucet has a cold water passage, a hot water passage, an automatic-mode water passage, and a manual-mode water passage. The control valve comprises a sliding member, a linking member, an operating member, and a housing. The sliding member has a notch communicating with the cold water hole, the hot water hole and the automatic-mode water passage. The sliding member further has a groove communicating with the manual-mode water passage. The operating member is configured to drive the linking member to slide the sliding member horizontally, and has a first position and a second position. When in the first position, the groove only communicates with the manual-mod water passage. When in the second position, the groove communicates with the cold water passage, the hot water passage and the manual-mode water passage. The housing covers the sliding member and the linking member. The linking member is recessed with a connecting groove and a restricting groove having an opening facing outward. The operating member includes a valve stem and a linking portion. The linking portion is accommodated in the connecting groove. The housing is provided with a guide block. The guide block is accommodated in the restricting groove.

When the control valve of the manual/automatic and cold/hot water faucet provided by the present invention is moved from the second position to the first position, the restricting groove of the linking member is moved in the direction of the guide block, and then the guide block is positioned in the restricting groove, so that the ratio of cold water to hot water in the automatic mode to dispense water will keep the same, thereby overcoming the defects of the conventional faucet.

DETAILED DESCRIPTION OF THE PREFERRED EMBODIMENTS

Embodiments of the present invention will now be described, by way of example only, with reference to the accompanying drawings.

Figure 1:
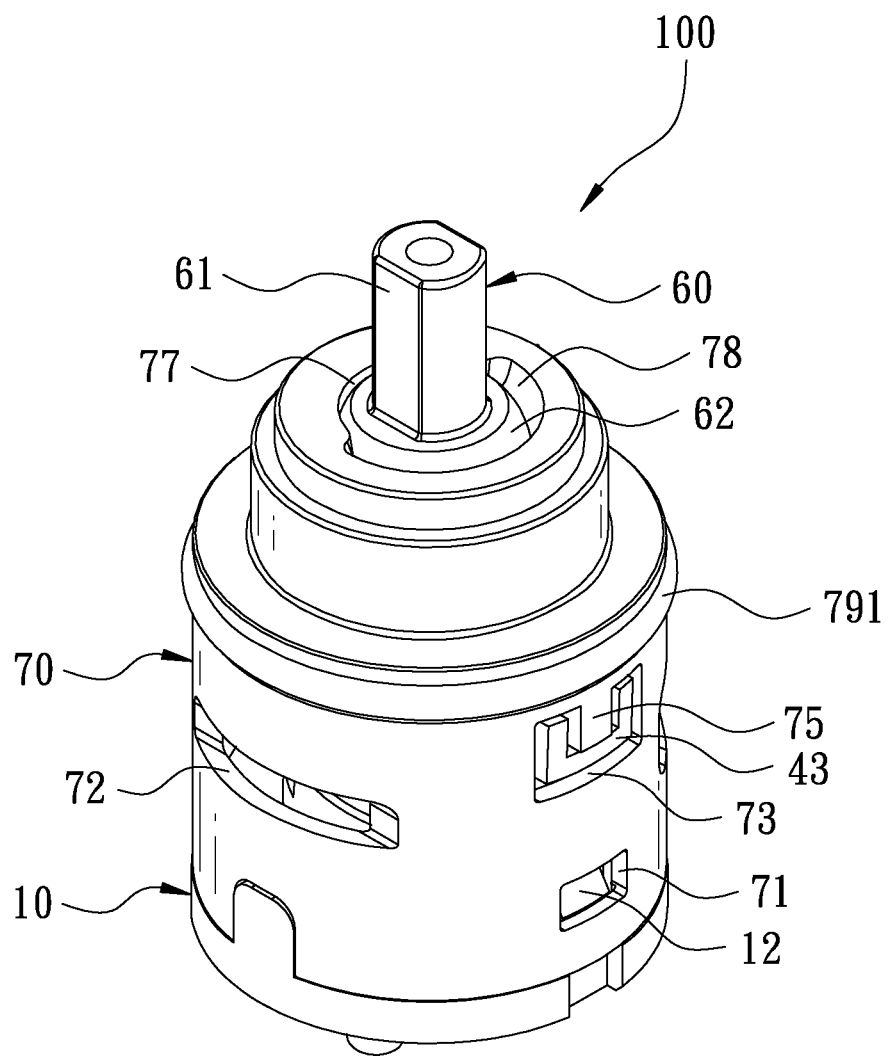
FIG. 1 is a perspective view of a preferred embodiment of the present invention.
Figure 2:
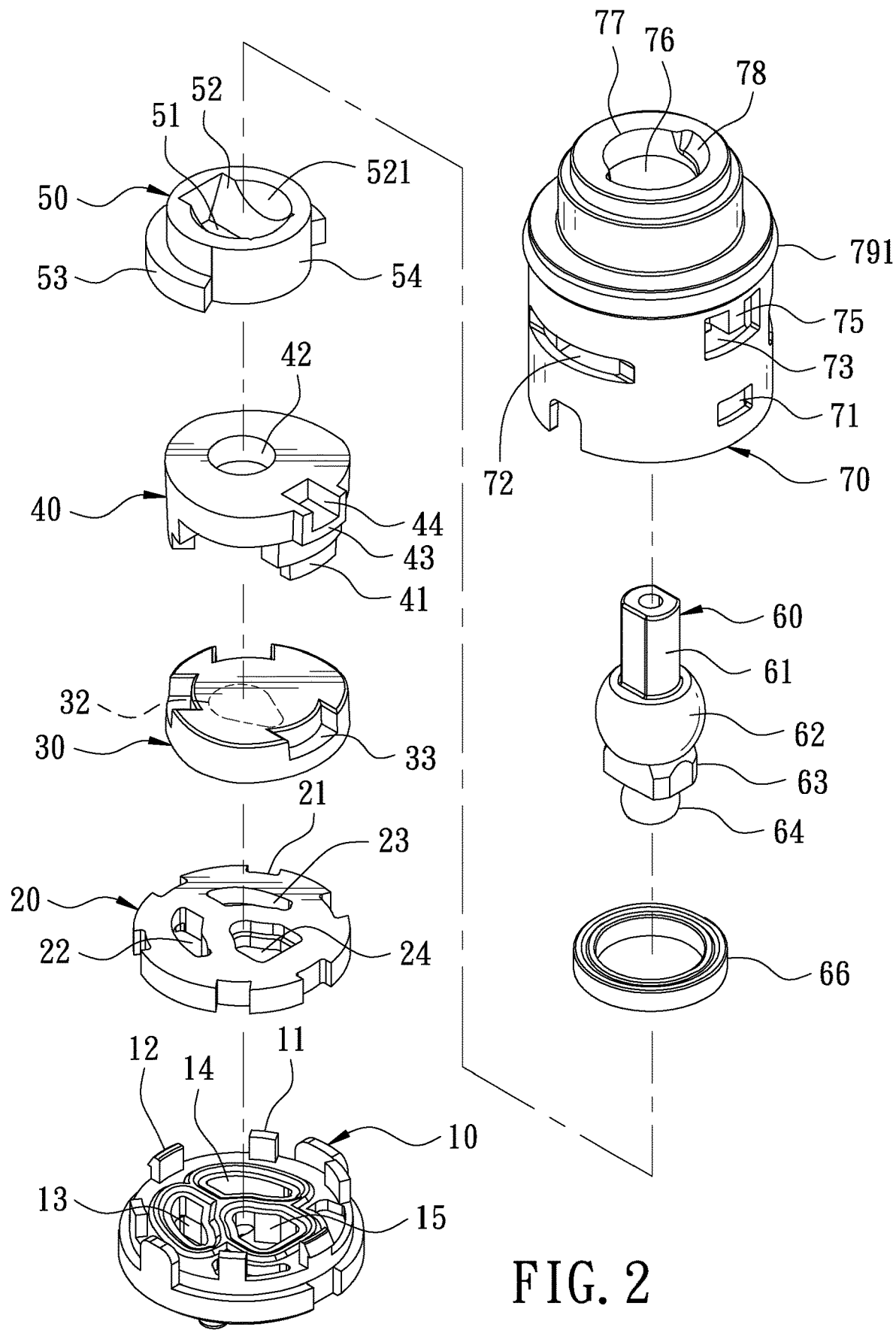
FIG. 2 is an exploded view of the preferred embodiment of the present invention.
Figure 3:
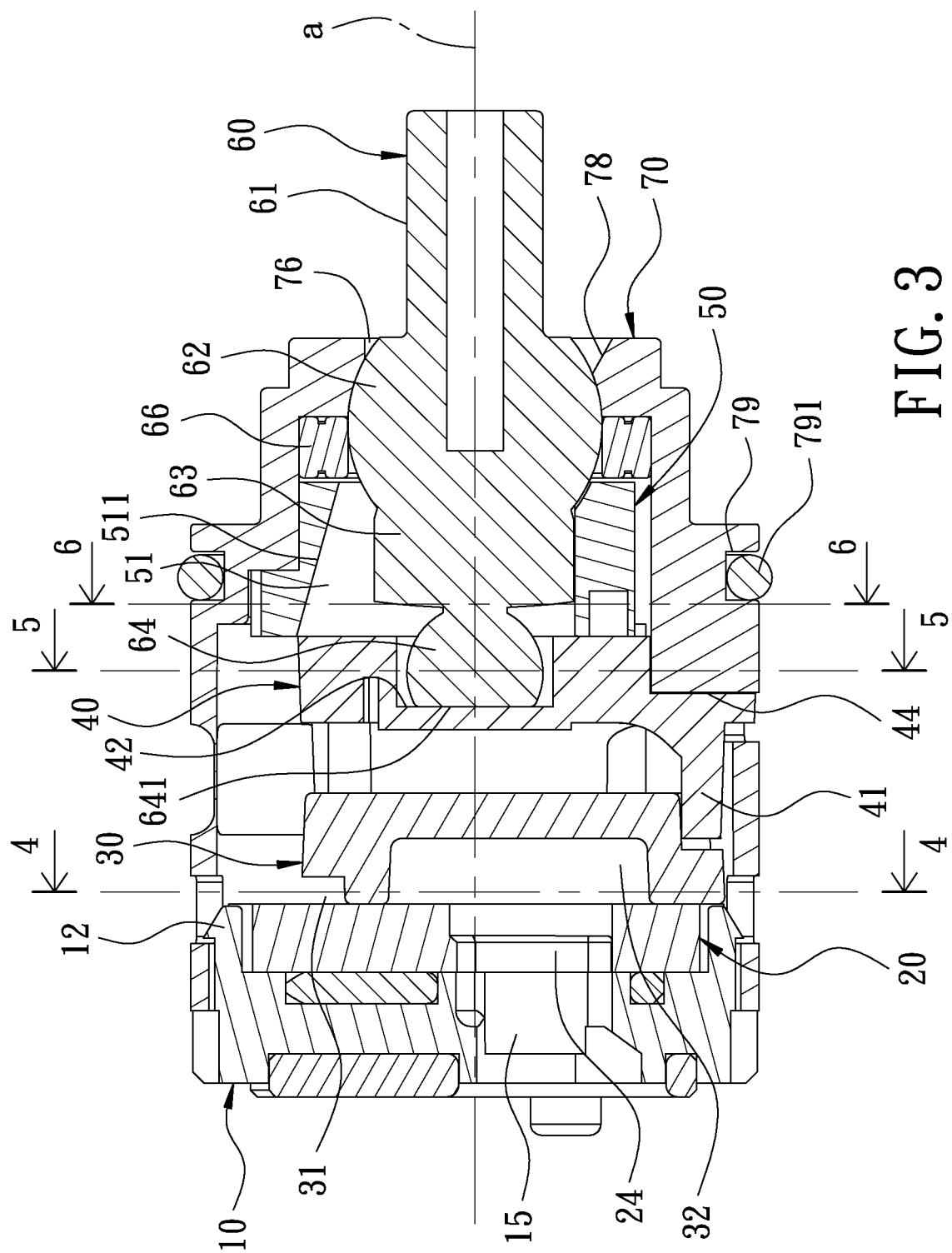
FIG. 3 is a longitudinal cross-sectional view of the preferred embodiment of the present invention, illustrating the state of the sliding member when it is in the first position.
Figure 7:
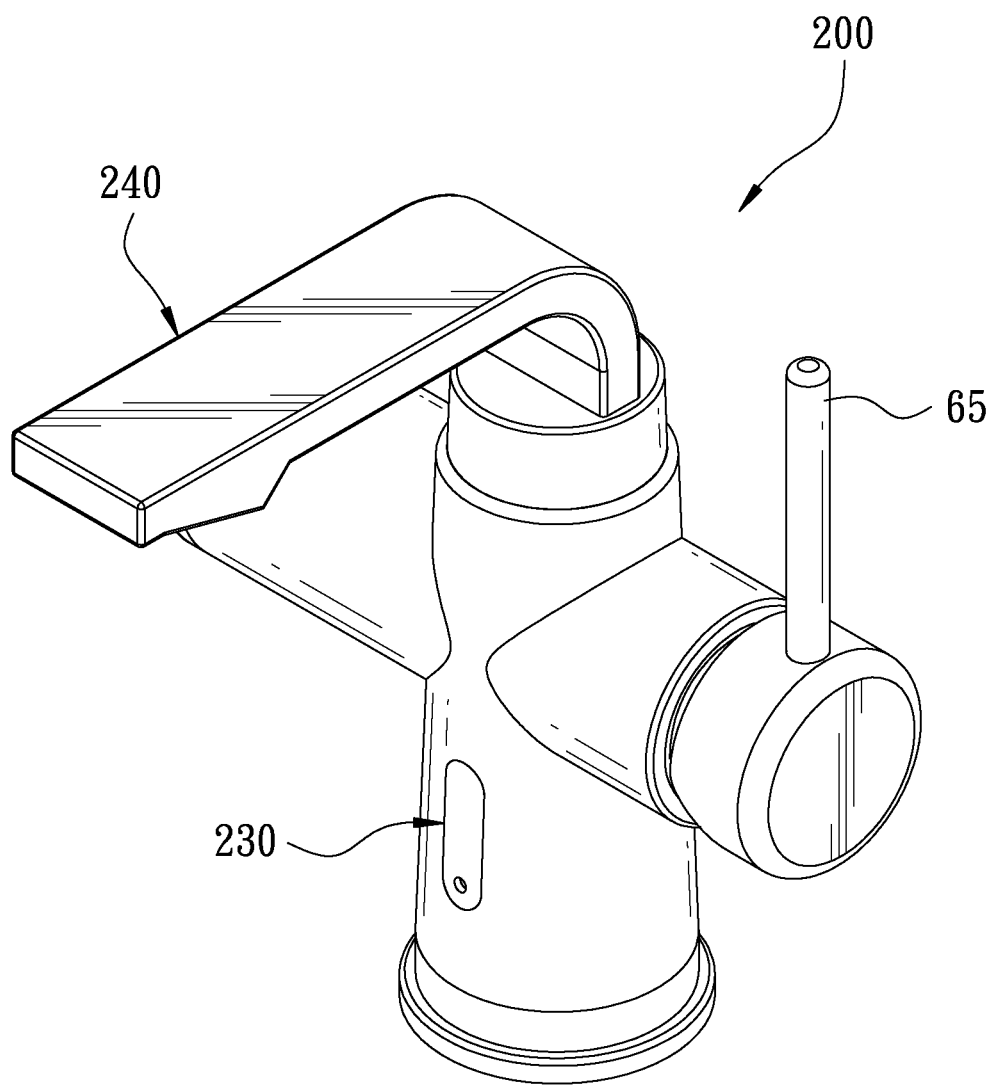
FIG. 7 is a perspective view of the preferred embodiment of the present invention mounted in the manual/automatic and cold/hot water faucet.
Figure 8:
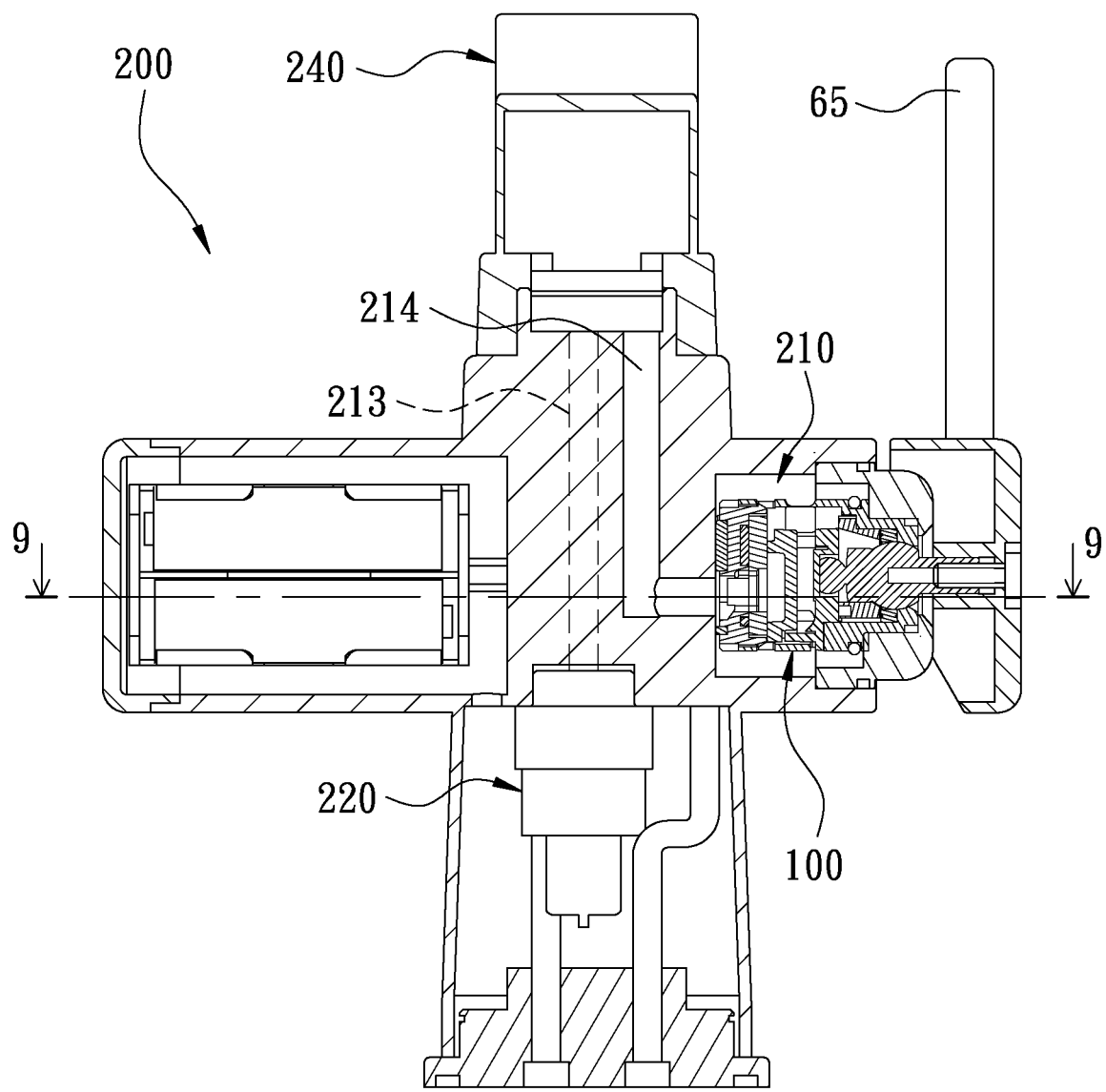
FIG. 8 is a longitudinal cross-sectional view of the preferred embodiment of the present invention mounted in the manual/automatic and cold/hot water faucet.
Figure 9:
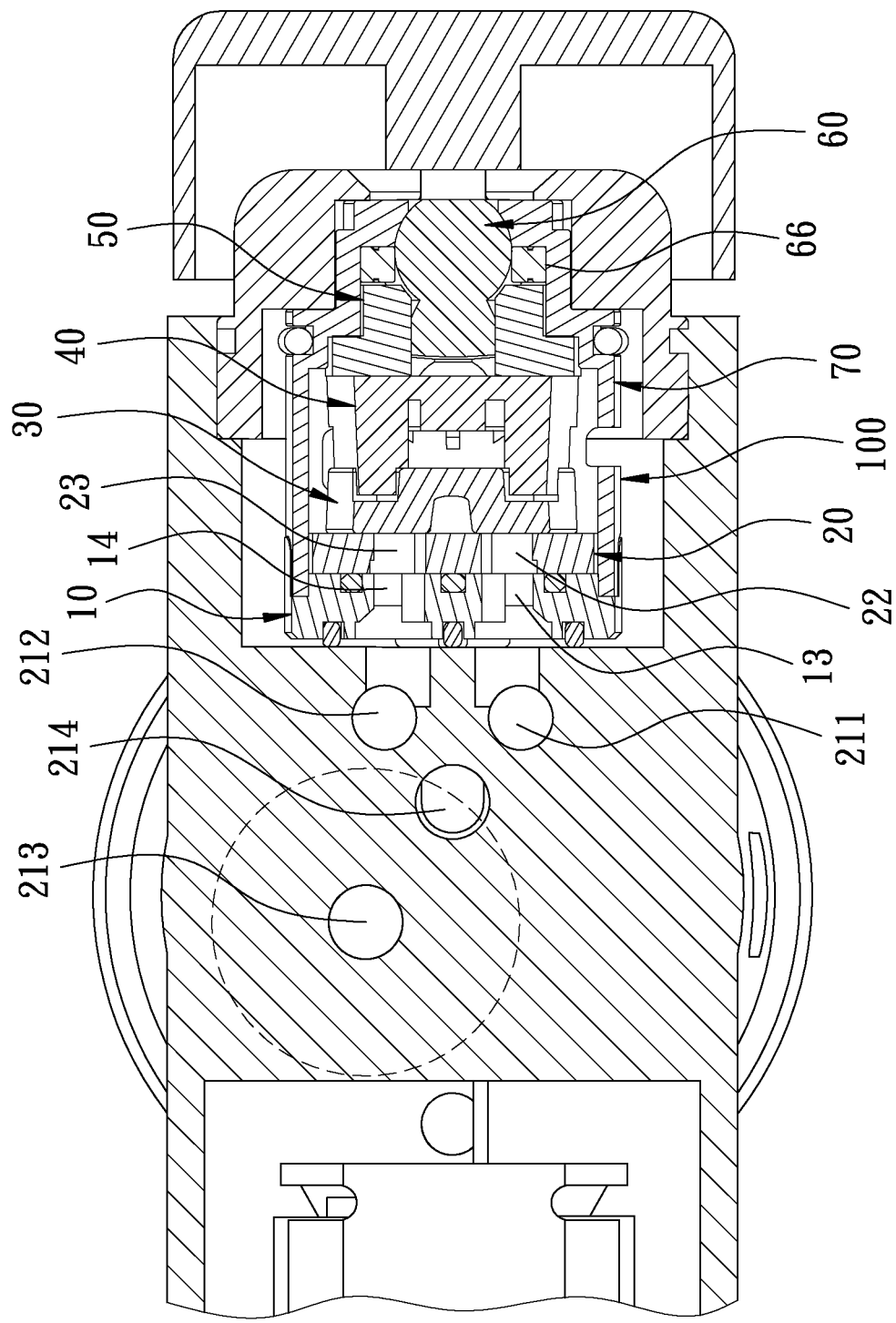
FIG. 9 is a cross-sectional view taken along line 9-9 of FIG. 8.
Figure 10:
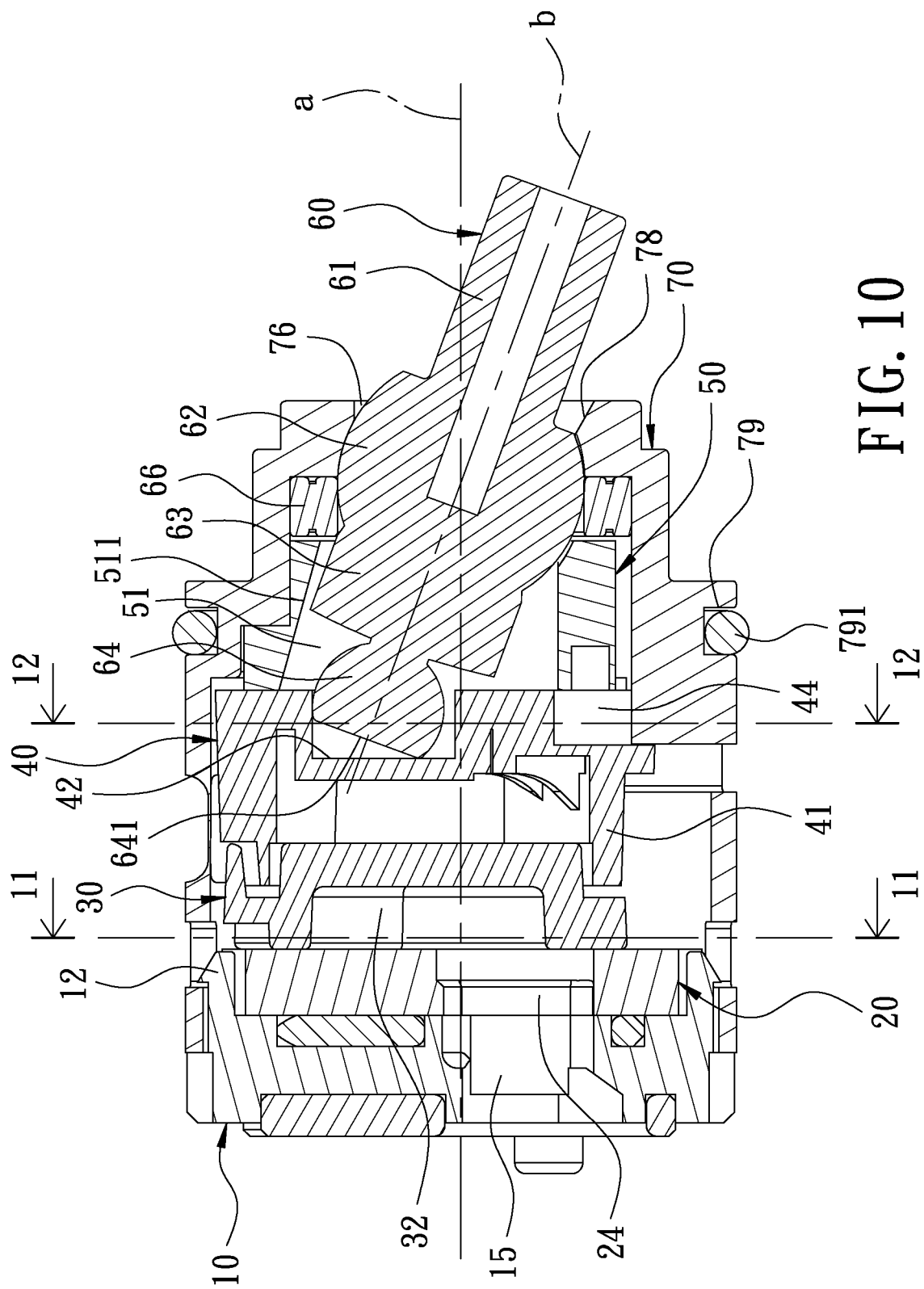
FIG. 10 is a longitudinal cross-sectional view of the preferred embodiment of the present invention, illustrating the state of the sliding member when it is in the second position.
Figure 11:
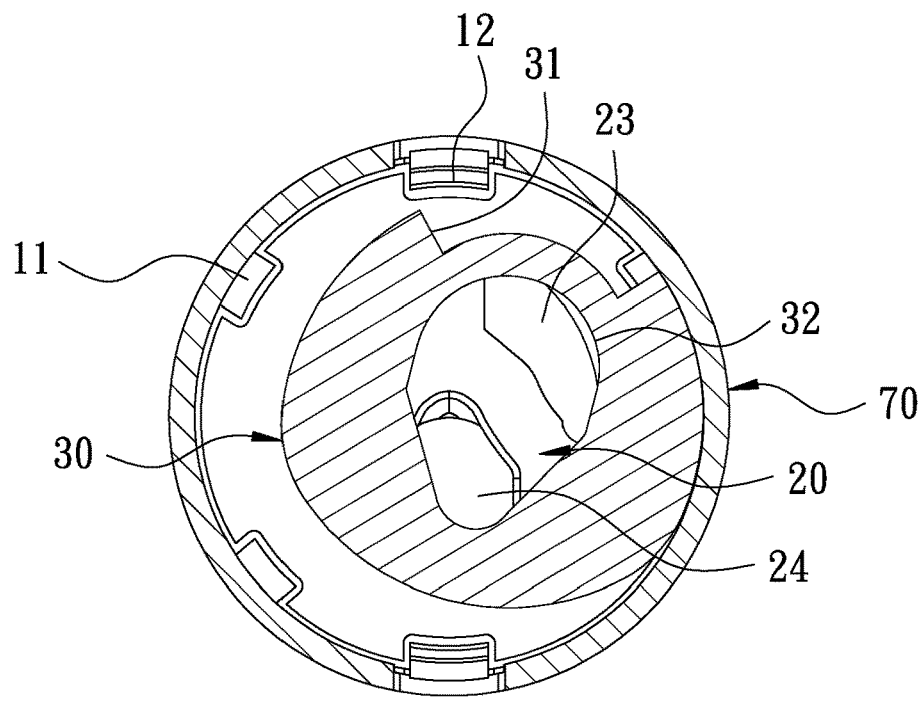
FIG. 11 is a cross-sectional view taken along line 11-11 of FIG. 10.
Figure 12:
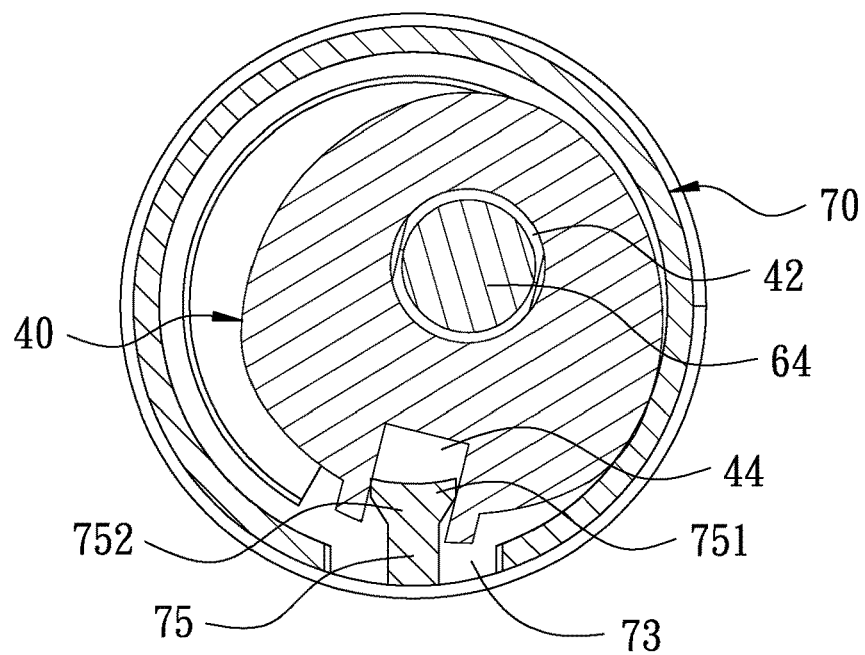
FIG. 12 is a cross-sectional view taken along line 12-12 of FIG. 10.

FIG. 1 is a perspective view of a preferred embodiment of the present invention. FIG. 2 is an exploded view of the preferred embodiment of the present invention. FIG. 3 is a longitudinal cross-sectional view of the preferred embodiment of the present invention. The present invention discloses a control valve 100 for a manual/automatic and cold/hot water faucet. The control valve 100 is mounted in a manual/automatic and cold/hot water faucet 200. As shown in FIGS. 7-9, the manual/automatic and cold/hot water faucet 200 has a valve chamber 210. The valve chamber 210 is in communication with a cold water passage 211 connected to a cold water source, a hot water passage 212 connected to a hot water source, an automatic-mode water passage 213, and a manual-mode water passage 214.

The automatic-mode water passage 213 is connected with a solenoid valve 220 for dispensing water controlled by the solenoid valve 220. The solenoid valve 220 is electrically connected to a sensor 230. The automatic-mode water passage 213 and the manual-mode water passage 214 are connected to a water outlet 240. The control valve 100 comprises a central axis A, a base 10, a retaining member 20, a sliding member 30, a linking member 40, a restricting member 50, an operating member 60, and a housing 70.

The base 10 includes a plurality of engaging blocks 11 and engaging hooks 12. Furthermore, the base 21 has a first through hole 13 corresponding to the cold water passage 211, a second through hole 14 corresponding to the hot water passage 212, and a third through hole 15 corresponding to the manual-mode water passage 214.

The retaining member 20 has engaging grooves 21 corresponding to the engaging blocks 11 of the base 10. The retaining member 20 has a cold water hole 22 corresponding to the first through hole 13, a hot water hole 23 corresponding to the second through hole 14, and a water exit 24 corresponding to the third through hole 15.

Figure 4:
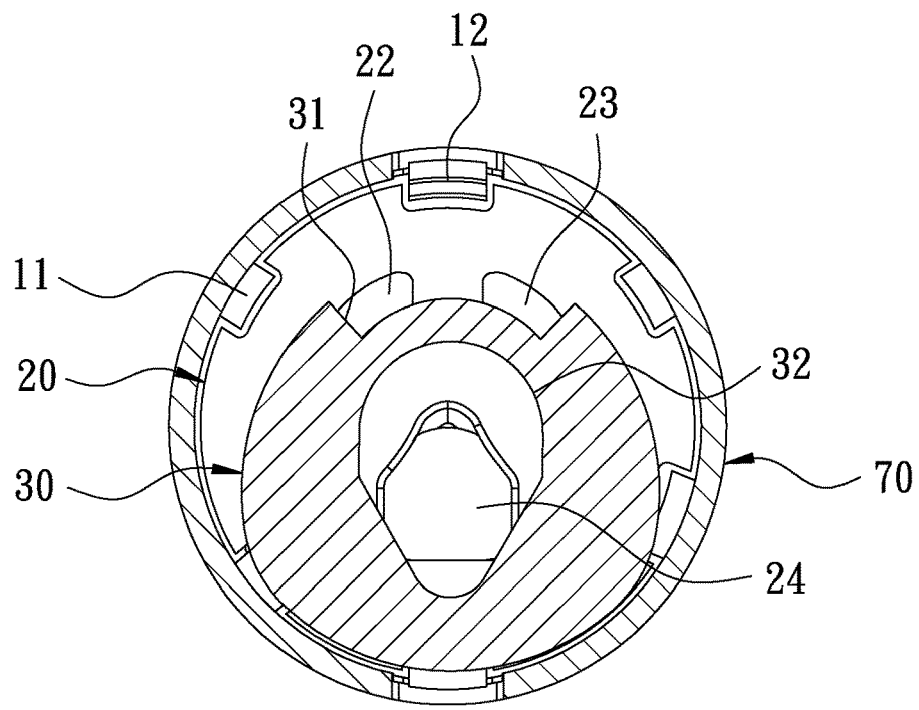
FIG. 4 is a cross-sectional view taken along line 4-4 of FIG. 3.

The sliding member 30 is located at one side of the retaining member 20. The outer edge of the sliding member 30 has a notch 31 communicating with the cold water hole 22 and the hot water hole 23. As shown in FIG. 4, the central portion of the sliding member 30 is formed with a groove 32 communicating with the water exit 24. The sliding member 23 can slide horizontally relative to the retaining member 20. Furthermore, the sliding member 30 is recessed with a plurality of positioning recesses 33.

The linking member 40 is located at one side of the sliding member 30 opposite to the retaining member 20. The linking member 40 includes positioning blocks 41 corresponding to the positioning recesses 33. The positioning blocks 41 are inserted into the positioning recesses 33, so that the linking member 40 can drive the sliding member 30 to act. The other side of the linking member 40, relative to the sliding member 30, is recessed with a connecting groove 42. The connecting groove 42 is a circular groove. The linking member 40 includes a connecting block 43 at one side of the connecting groove 42. The connecting block 43 protrudes from the outer peripheral surface of the linking member 40. The linking member 40 and the connecting block 43 are recessed with a restricting groove 44 having an opening facing outward.

The restricting member 50 is located at one side of the linking member 24 opposite to the sliding member 23. The restricting member 50 has a restricting hole 251 corresponding to the connecting groove 42. The restricting hole 51 is a trapezoidal hole. As shown in FIG. 3, the inner circumferential wall of the restricting hole 51 has an oblique restricting surface 511, so that one end of the restricting hole 51, close to the linking member 40, is greater in diameter than the other end of the restricting hole 51, opposite to the linking member 40. One end of the restricting hole 51, opposite to the linking member 40, is formed with a restricting opening 52. Three sides of the restricting opening 52, opposite to the restricting surface 511, each form a positioning surface 521. The positioning surfaces 521 are slightly arc-shaped. The outer periphery of the restricting member 50 is provided with a restricting rib 53 extending in the circumferential direction. One end of the restricting rib 53, opposite to the restricting surface 511, has a restricting notch 54.

The operating member 60 is connected to the linking member 40 and the restricting member 50 for operating the linking member 40 to slide relative to the sliding member 30. In the embodiment of the present invention, the operating member 60 includes a valve stem 61, a rotating portion 62, a restricting portion 63 and a linking portion 64 that are connected to one another. The valve stem 61 is coupled to an operating lever 65. The outer surfaces of the rotating portion 62 and the linking portion 64 are arc-shaped or circular in a cross-sectional view. The rotating portion 62 is rotatable and abuts against the positioning surface 521. A washer 66 is fitted on the outer circumference of the rotating portion 62. The washer 66 is connected to the restricting member 50. The restricting portion 63 has a non-circular cross-section. In the embodiment of the present invention, the cross-section of the restricting portion 63 is rectangular and has a chamfer, so that the restricting portion 63 is restricted in the restricting hole 51 and can be moved in the direction of the restricting surface 511. The linking portion 64 is accommodated in the connecting groove 42 to drive the linking member 40 to move. The bottom of the linking portion 64 has a circular stop surface 641 to abut against the bottom of the connecting groove 42.

Figure 5:
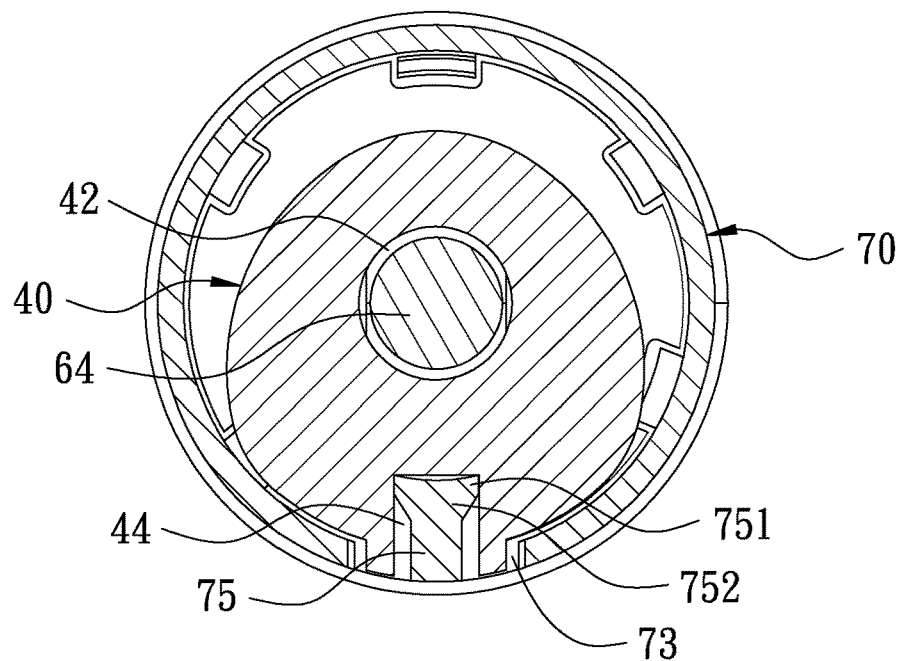
FIG. 5 is a cross-sectional view taken along line 5-5 of FIG. 3.
Figure 6:
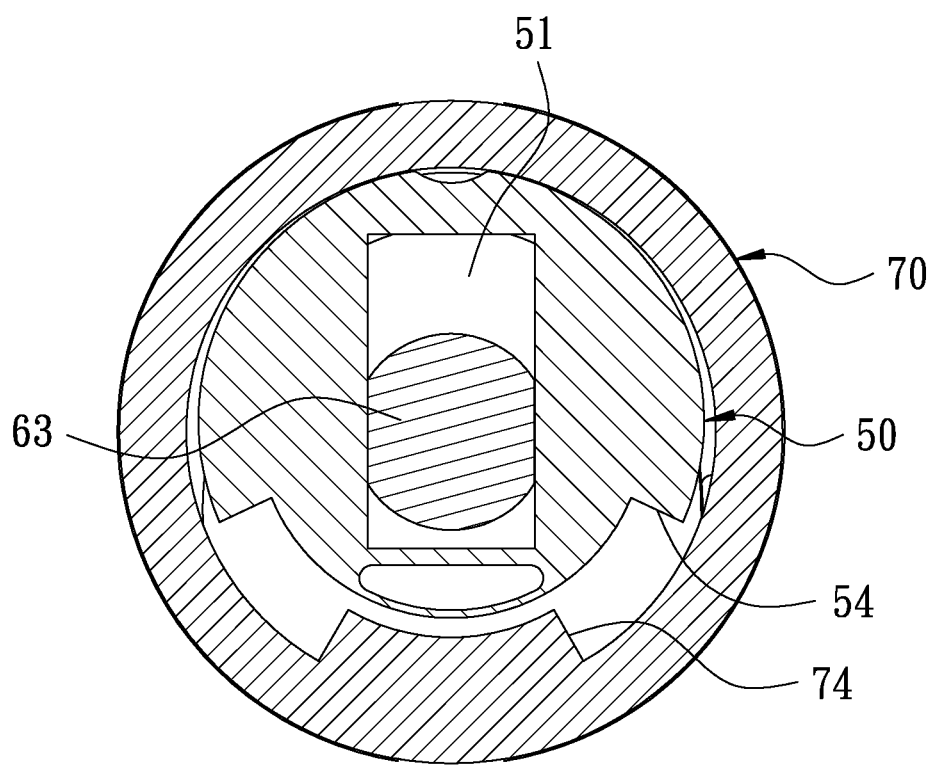
FIG. 6 is a cross-sectional view taken along line 6-6 of FIG. 3.

The housing 70, referring to FIG. 5 and FIG. 6, the housing 70 has an engaging opening 71 corresponding to the engaging hook 12. The retaining member 20, the sliding member 30, the linking member 40 and the restricting member 50 are accommodated in the housing 70. The housing 70 has at least one slot 72. The slot 72 is in communication with the notch 31 and the automatic-mode water passage 213. The annular side of the housing 70 is formed with a positioning opening 73. The connecting block 43 is accommodated in the positioning opening 73. The housing 70 includes a raised fan-shaped restricting block 74 near the positioning opening 73. As shown in FIG. 6, the restricting block 74 is located in the restricting notch 54, thereby blocking the restricting rib 53 to restrict the rotation angle of the restricting member 50. A rectangular guide block 75 is provided on one side of the restricting block 74, corresponding to the restricting groove 44 of the linking member 40. The guide block 75 is accommodated in the restricting groove 44. One end of the guide block 75, close to the central axis a, has a guide portion 751. The width of the guide portion 751 is greater than the width of the guide block 75. The width of the guide portion 751 is slightly greater than or equal to the width of the restricting groove 44. A tapered portion 752 is provided between the guide block 75 and the guide portion 751. The tapered portion 752 is tapered from the guide portion 751 toward the guide block 75. The housing 70 has a valve stem opening 76. The diameter of the valve stem opening 76 is less than the maximum diameter of the rotating portion 62. The housing 70 is recessed with an arc-shaped inner annular groove 77 close to the valve stem opening 76, so that the rotating portion 62 is rotatable among the positioning surfaces 521, the washer 66 and the inner annular groove 77. Part of the inner circumferential wall of the valve stem opening 76 of the housing 70 is recessed with an oblique groove 78 that is inclined in the direction of the central axis a. The annular side of the housing 70 is formed with an outer annular groove 79 close to the positioning opening 73. A ring 791 is fitted in the outer annular groove 79.

Please refer to FIGS. 2 to 5 again. The operating member 60 can drive the valve stem 61 to rotate through the operating lever 65, and defines a first position for an automatic mode to dispense water and a second position for a manual mode to dispense water. In the first position, the operating member 60, the connecting groove 42 and the central axis a are arranged concentrically, so that the notch 31 communicates with the cold water hole 22 and the hot water hole 23, and the groove 32 only communicates with the water exit 24. As shown in FIGS. 7-9, the cold water flows into the valve chamber 210 from the cold water passage 211 through the first through hole 13, the cold water hole 22, the notch 31 and the slot 72. The hot water flows into the valve chamber 210 from the hot water passage 212 through the second through hole 14, the hot water hole 23, the notch 31 and the slot 72. The bottom of the restricting groove 44 abuts against the guide portion 751 of the guide block 75. The free end of the connecting block 43 is accommodated in the positioning opening 73, so that the overlapping area of the notch 31 and the cold water hole 22 is equal to the overlapping area of the notch 31 and the hot water hole 23. Therefore, the ratio of cold water to hot water in the valve chamber 210 is the same. The mixed water further flows to the automatic-mode water passage 213. The user only needs to trigger the sensor 230 to open the solenoid valve 220 by hand, and the water flows to the water outlet 240 to dispense water automatically.

Please refer to FIG. 2 and FIGS. 8 to 12 again. When the operating member 60 is in the second position, the user can pull the operating lever 65 to move the valve stem 61 of the operating member 60 toward the oblique groove 78. The restricting portion 63 moves toward the restricting surface 511 in the restricting hole 51, so that an included angle is defined between the axis b of the operating member 60 and the central axis a. The linking portion 64 drives the linking member 40 to move, so that the bottom of the restricting groove 44 is away from the guide portion 751 of the guide block 75 with the guide portion 751 as a reference. The linking member 40 drives the sliding member 30 to slide. The groove 32 of the sliding member 30 communicates with the cold water hole 22, the hot water hole 23 and the water exit 24, so that the cold water from the cold water source directly passes through the cold water hole 22 and the hot water from the hot water source directly passes through the hot water hole 23 to flow into the groove 32 for mixing water. The user can rotate the operating member 60 through the operating lever 65 to move the valve stem 61 of the operating member 60 in the circumferential direction of the oblique groove 78 to change the overlapping area of the notch 31, the cold water hole 22 and the hot water hole 23 for controlling the mixing ratio of cold water and hot water in the groove 32 to adjust the water temperature. After the mixed water flows from the water exit 24 through the third through hole 15 and the manual-mode water passage 214, it flows out from the water outlet 240. After use, the operating member 60 is returned to the first position to finish dispensing water in the manual mode.

Please refer to FIGS. 2 to 5 again. If in a mixing ratio that hot water is more than cold water in the manual mode, when the operating member 60 returns from the second position to the first position, the linking portion 64 drives the linking member 40 and the sliding member 30 through the connecting groove 42. At the same time, the restricting groove 44 of the linking member 40 is moved toward the positioning opening 73 in the direction of the guide block 75, so that the bottom of the restricting groove 44 abuts against the guide portion 751 of the guide block 75, and the free end of the connecting block 43 is accommodated in the positioning opening 73. The valve stem 61, the connecting groove 42 and the central axis a are arranged concentrically, so that the overlapping area of the notch 31 and the cold water hole 22 is equal to the overlapping area of the notch 31 and the hot water hole 23. The ratio of cold water to hot water in the automatic mode will keep the same each time, thereby overcoming the defects of the conventional faucet.

Please refer to FIG. 2, FIG. 5 and FIG. 8. The linking portion 64 has a circular outer surface, and the connecting groove 42 is a circular groove. Therefore, when the operating member 60 is rotated by the operating lever 65 in the first position, the linking portion 64 will rotate idly and will not drive the linking member 40 and the sliding member 30 to act, and the bottom of the restricting groove 44 abuts against the guide portion 751 of the guide block 75. Therefore, the overlapping area of the groove 31, the cold water hole 22 and the hot water hole 23 will not be changed, so that the ratio of cold water to hot water in the automatic mode will keep the same, thereby keeping the water temperature in the automatic mode to dispense water.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A control valve of a manual/automatic and cold/hot water faucet, the control valve being mounted in the manual/automatic and cold/hot water faucet, the manual/automatic and cold/hot water faucet having a cold water passage, a hot water passage, an automatic-mode water passage and a manual-mode water passage, the control valve comprising a sliding member, a linking member, an operating member and a housing, the sliding member having a notch communicating with the cold water hole, the hot water hole and the automatic-mode water passage, the sliding member further having a groove communicating with the manual-mode water passage, the operating member being configured to drive the linking member to slide the sliding member horizontally and having a first position and a second position, when in the first position, the groove only communicating with the manual-mode water passage, when in the second position, the groove communicating with the cold water passage, the hot water passage and the manual-mode water passage, the housing covering the sliding member and the linking member, characterized in that:
the linking member is recessed with a connecting groove and a restricting groove, the operating member includes a valve stem and a linking portion, the linking portion is accommodated in the connecting groove, the housing is provided with a guide block, when in the first position, the guide block is accommodated in the restricting groove.

2. The control valve of the manual/automatic and cold/hot water faucet as claimed in claim 1, wherein the linking member includes a connecting block at one side of the connecting groove, the connecting block protrudes from an outer peripheral surface of the linking member, the linking member and the connecting block are recessed with the restricting groove, an annular side of the housing is formed with a positioning opening, and the connecting block is accommodated in the positioning opening.

3. The control valve of the manual/automatic and cold/hot water faucet as claimed in claim 1, wherein the guide block has a guide portion, the guide portion has a width greater than that of the guide block, the width of the guide portion is slightly greater than or equal to a width of the restricting groove, a tapered portion is provided between the guide block and the guide portion, and the tapered portion is tapered from the guide portion toward the guide block.

4. The control valve of the manual/automatic and cold/hot water faucet as claimed in claim 1, further comprising a restricting member located between the linking member and the operating member, the restricting member having a restricting hole, an inner circumferential wall of the restricting hole having an oblique restricting surface, the operating member including a restricting portion, the restricting portion being located between the valve stem and the linking portion, the restricting portion being restricted in the restricting hole.

5. The control valve of the manual/automatic and cold/hot water faucet as claimed in claim 4, wherein one end of the restricting hole, relative to the operating member, is formed with a restricting opening, the restricting hole is recessed with at least one arc-shaped positioning surface at the restricting opening, the operating member includes a rotating portion, the rotating portion is located between the valve stem and the restricting portion, the housing has a valve stem opening, and the housing is recessed with an arc-shaped inner annular groove close to the valve stem opening for the rotating portion to be positioned at the positioning surface and the inner annular groove.

6. The control valve of the manual/automatic and cold/hot water faucet as claimed in claim 4, wherein an outer periphery of the restricting member is provided with a restricting rib, one end of the restricting rib, opposite to the restricting surface, has a restricting notch, the housing includes a fan-shaped restricting block, the restricting block is located in the restricting notch, the restricting block is provided with the guide block, the housing has a valve stem opening, and one part of an inner circumferential wall of the valve stem opening of the housing is recessed with an oblique groove for restricting a rotation angle of the restricting member.

7. The control valve of the manual/automatic and cold/hot water faucet as claimed in claim 1, wherein the connecting groove is a circular groove, and a bottom of the linking portion has a circular stop surface to abut against a bottom of the connecting groove.

* * * * *